Nov. 28, 1967   J. L. WICKHAM   3,354,732
REGULATOR FOR VALVE OF PNEUMATIC TOOL
Filed Oct. 21, 1965
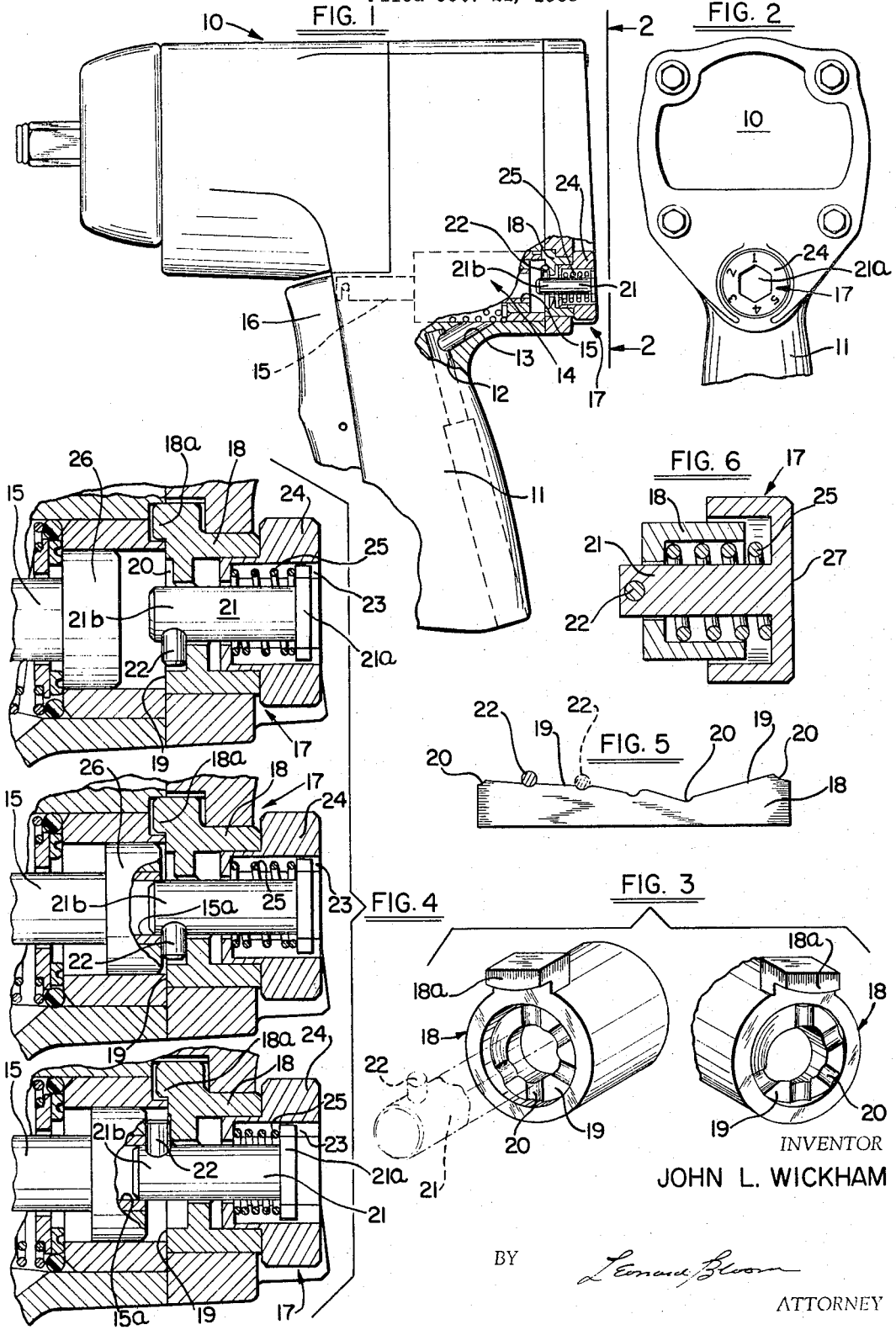
INVENTOR
JOHN L. WICKHAM
BY
Leonard Bloom
ATTORNEY

United States Patent Office 3,354,732
Patented Nov. 28, 1967

3,354,732
REGULATOR FOR VALVE OF PNEUMATIC TOOL
John L. Wickham, Baltimore, Md., assignor to The Black and Decker Manufacturing Company, Towson, Md., a corporation of Maryland
Filed Oct. 21, 1965, Ser. No. 499,734
5 Claims. (Cl. 74—99)

ABSTRACT OF THE DISCLOSURE

The device disclosed herein is a portable, pneumatic tool which includes a motor supporting and enclosing housing, provided with a pendant-type handle. The motor is controlled by a valve located within the housing, and the valve is operated by a trigger carried upon the handle. Means is provided to control the maximum pressure delivered to the motor through the valve and this means is selectively adjustable from without the housing.

---

The present invention relates to a regulator for the valve of a pneumatic tool, and more particularly, to the improved construction of a valve regulator to be used, for example, in a portable pneumatic impact wrench.

It is an object of the present invention to provide a regulator for limiting the movement of a valve member so as to regulate the maximum amount of compressed air admitted to the tool motor.

It is a further object to provide a regulator which is efficient in its operation, compact, economical, and easy to assemble within the tool.

In accordance with the broad teachings of the present invention, the regulator comprises, in combination, a stationary member having a first cam means. A rotatable axially-movable stop member is provided which has a second cam means cooperating with the first cam means to determine the axial position of the stop member relative to the tool. The stop member has abutment means formed thereon for engaging the valve member, thereby limiting the movement of the latter.

In accordance with the specific teachings of the present invention, the first cam means comprises an annular cam formed with circumferentially-spaced pockets. The stop member comprises a shaft concentrically disposed within the stationary member; and the second cam means comprises a follower carried by the shaft and engaging within a respective one of the pockets in the annular cam.

Preferably, a manually-shiftable member extends beyond the tool and has means cooperating with the stop member for conjoint rotation of both members. This means provides for an axial movement of the stop member relative to the manually shiftable member to determine the maximum degree of movement of the valve member. Preferably, the stop member has a headed portion disposed concentrically of the manually-shiftable member; and spring means is disposed between the manually-shiftable member and the underside of the headed portion of the stop member, thereby maintaining the position of the regulator.

These and other objects of the present invention will become apparent from a reading of the following specification, taken in conjunction with the enclosed drawings, in which:

FIGURE 1 is a side elevation of a typical pneumatic tool incorporating the teachings of the present invention, with parts broken away and sectioned to show the structure of the valve regulator;

FIGURE 2 is an end elevation, taken along the lines 2—2 of FIGURE 1;

FIGURE 3 is an enlarged fragmentary portion of FIGURE 1, showing (in sequence) the manner in which the regulator limits the maximum degree of movement (sometimes referred to as the "travel") of the valve operating member;

FIGURE 4 shows the left and right perspective views of the stationary member of the regulator, the stationary member having the annular cam formed therein;

FIGURE 5 is a development or plan layout of the annular cam, showing the pockets formed therein to receive the follower carried by the rotatable stop member; and FIGURE 6 is a modification showing the manually-shiftable member and the axially-movable stop member formed integrally as a single element.

With reference to FIGURE 1, there is illustrated a portable pneumatic impact wrench 10 within which the teachings of the present invention may find particular utility. It will be appreciated, however, that the scope of the invention is not confined thereto, but rather is equally applicable to all types of pneumatically-operated devices. With this in mind, the wrench includes a handle 11 having a conduit 12 connected with a source of compressed air, a passageway 13 in communication with the conduit, a valve mechanism (shown only partially) denoted generally as at 14, the valve mechanism including an operating valve stem 15, the valve stem being guided for limited longitudinal movement in accordance with the movement of a pivoted trigger 16 mounted on the handle, and the regulator of the present invention, the latter denoted generally as at 17, and being adapted to limit the maximum degree of movement of the valve stem, thereby regulating the maximum amount of compressed air admitted through the valve mechanism into the tool.

With reference to the remaining drawings, the regulator of the present invention includes a stationary member 18, generally in the form of a collar, having a tab portion 18a for its proper positioning and retention within the tool. The stationary member 18 has a first cam means formed as an annular cam 19. This annular cam, see FIGURE 5, has a series of indented pockets 20. A stop member 21 is disposed, preferably concentrically, within the stationary member. This stop member 21 is preferably formed as a rotatable shaft having a limited axial movement relative to the tool. The stop member 21 carries a follower pin 22 which comprises a second cam means. The pin 22 is adapted to be received within one of the pockets 20 on the annular cam 19, and in this manner, determines the relative axial position of the stop member as it is rotated. The stop member abuts against the operating valve stem, see FIGURE 3, to limit the degree of "travel" of the latter, hence the maximum amount of compressed air admissible into the tool.

Preferably, the stop member (or shaft) 21 has a headed portion 21a engaging a socket 23 formed in a manually-movable shift member 24. With this arrangement, the shift member 24 and the shaft 21 has a conjoint rotation, but the shaft 21 may move axially relative thereto. Preferably, a coil spring 25 is disposed between the shift member and the underside of the headed portion 21a of the shaft. This maintains the regulator in its adjusted position.

As shown in FIGURE 4, the operating valve stem, and more particularly a spool 26 carried thereon, abuts against the follower pin 22 to limit the maximum degree of travel (or "throw") of the valve. The pin 22 thereby comprises an "abutment means" on the stop member 21, but other abutment means may be provided, if desired. The forward portion of the shaft, denoted as at 21b, is merely guided within the longitudinal bore 15a of the tubular valve stem.

As shown in FIGURE 6, a manually-shiftable member 27 may be formed integrally with the stop member 21, if desired.

By using a cooperating cam means (19 and 22) to determine the relative axial position of the valve regulator member 21, it is possible to obtain non-uniform axial advances of the regulator with uniform rotational advances of its knob (or shift member) 24; and this is an added feature of the present invention. As shown in FIGURE 2, the knob 24 may carry graduations to indicate the relative position of the regulator.

The valve mechanism itself forms no part of the present invention, but is described more particularly in the copending Wickham application Ser. No. 499,733, filed Oct. 21, 1965, entitled "Valve for Reversible Pneumatic Tool," and assigned to the assignee of the present invention.

Obviously, many modifications may be made without departing from the basic spirit of the present invention; and accordingly, within the scope of the appended claims, the invention may be practiced other than has been specifically described herein.

I claim:

1. In a pneumatic tool, a regulator to limit the maximum movement of a valve member, thereby to regulate the maximum amount of compressed air admitted to the tool motor, said regulator comprising, in combination:
   (a) a stationary member having a first cam means;
   (b) a rotatable axially-movable stop member having second cam means;
   (c) one of said cam means comprising angularly spaced pockets disposed at different axial positions;
   (d) the other of said cam means comprising a member receivable selectively in said pockets;
   (e) whereby to determine the axial position of said stop member relative to said tool; and
   (f) abutment means on said stop member for engaging the valve member, thereby limiting the maximum movement of the latter.

2. In a pneumatic tool, a regulator to limit the maximum movement of a valve member, thereby to regulate the maximum amount of compressed air admitted to the tool motor, said regulator comprising, in combination:
   (a) a stationary member having an annular cam formed with circumferentially-spaced pockets;
   (b) a rotatable, axially-movable shaft concentrically disposed within said stationary member and having a follower carried thereby and engaging within a respective one of said pockets to determine the axial position of said shaft relative to the tool; and
   (c) abutment means on said shaft for engaging the valve member, thereby limiting the maximum movement of the latter.

3. In a pneumatic tool, a regulator to limit the maximum movement of a valve member, thereby to regulate the maximum amount of compressed air admitted to the tool motor, said regulator comprising, in combination:
   (a) a stationary member having a first cam means;
   (b) a rotatable axially-movable stop member having second cam means cooperating with said first cam means to determine the axial position of said stop member relative to the tool;
   (c) abutment means on said stop member for engaging the valve member, thereby limiting the maximum movement of the latter;
   (d) a manually-shiftable member extending beyond the tool;
   (e) said manually-shiftable member having means cooperating with said stop member for conjoint rotation of said members;
   (f) said means providing for an axial movement of said stop member relative to said manually shiftable member.

4. The combination of claim 3, wherein:
   (a) said stop member has a headed portion disposed concentrically of said manually-shiftable member; and wherein:
   (b) spring means is disposed between said manually-shiftable member and the underside of said headed portion of said stop member, thereby maintaining the position of the regulator.

5. In a pneumatic tool, a regulator to limit the maximum movement of a valve member, thereby to regulate the maximum amount of compressed air admitted to the tool motor, said regulator comprising, in combination:
   (a) an axially-movable manually-rotatable stop member having abutment means for engaging the valve member, thereby limiting the maximum movement of the latter;
   (b) a stationary cam adjacent said stop-member;
   (c) one of said stop-member and cam having an irregular surface defining a plurality of angularly spaced, first means disposed at different axial positions thereon;
   (d) the other of said stop-member and cam having second means cooperable selectively with said first means;
   (e) whereby to determine the relative axial position of said stop-member in accordance with its manually-rotated position; and
   (f) means to maintain cooperation between said first and second means and retain said stop member in its manually adjusted position.

No references cited.

FRED C. MATTERN, JR., *Primary Examiner.*

W. S. RATLIFF, *Assistant Examiner.*